United States Patent
Palenius

(10) Patent No.: US 6,985,741 B2
(45) Date of Patent: Jan. 10, 2006

(54) ESTIMATION OF INTERFERENCE IN A RADIO COMMUNICATION NETWORK

(75) Inventor: Torgny Palenius, Löddeköpinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 374 days.

(21) Appl. No.: 10/242,718

(22) Filed: Sep. 13, 2002

(65) Prior Publication Data

US 2003/0096618 A1    May 22, 2003

Related U.S. Application Data

(60) Provisional application No. 60/331,191, filed on Nov. 9, 2001.

(51) Int. Cl.
    *H04Q 7/20* (2006.01)

(52) U.S. Cl. ............... 455/453; 455/450; 455/452.2; 455/67.3; 370/332; 370/333; 370/329

(58) Field of Classification Search ............... 455/67.1, 455/67.3, 67.11, 67.13, 450, 453, 436, 452.2; 370/332, 333, 329
See application file for complete search history.

(56) References Cited

U.S. PATENT DOCUMENTS

| | | | | |
|---|---|---|---|---|
| 6,463,105 | B1 * | 10/2002 | Ramesh | 375/262 |
| 6,771,965 | B2 * | 8/2004 | Hamabe | 455/442 |
| 6,834,076 | B2 * | 12/2004 | Xu | 375/211 |
| 2002/0058479 | A1 * | 5/2002 | Voyer | 455/67.1 |
| 2003/0016641 | A1 * | 1/2003 | Terry et al. | 370/335 |
| 2003/0086394 | A1 * | 5/2003 | Zeira et al. | 370/331 |

OTHER PUBLICATIONS

3G TS 25.215 v3.2.0 (Mar. 2000), 3rd Generation Partnership Project; Technical Specification Group Radio Access Network; Physical Layer-Measurments (Release 1999).*

* cited by examiner

*Primary Examiner*—Temica M. Beamer
*Assistant Examiner*—Anthony S. Addy

(57) ABSTRACT

Method and apparatus are provided for the determination of the downlink quality of a channel between a base station and a mobile station. The methods and apparatus involve the use of existing system measurements, system parameters and mobile station measurements, thereby ensuring backward compatibility with existing mobile stations. The methods and apparatus can also be employed for the determination of the downlink channel quality for a mobile station which has established radio links with one or more base stations while the mobile station is performing soft handover.

10 Claims, 3 Drawing Sheets

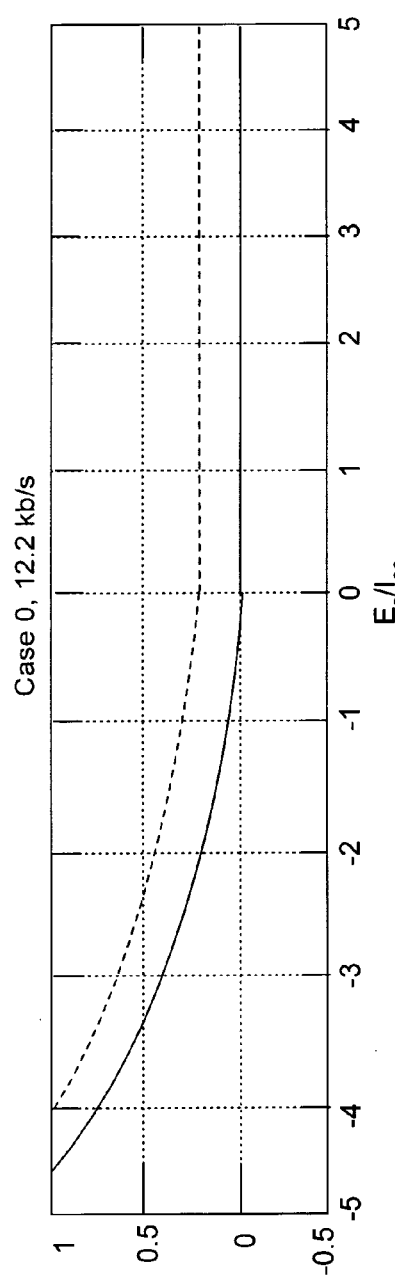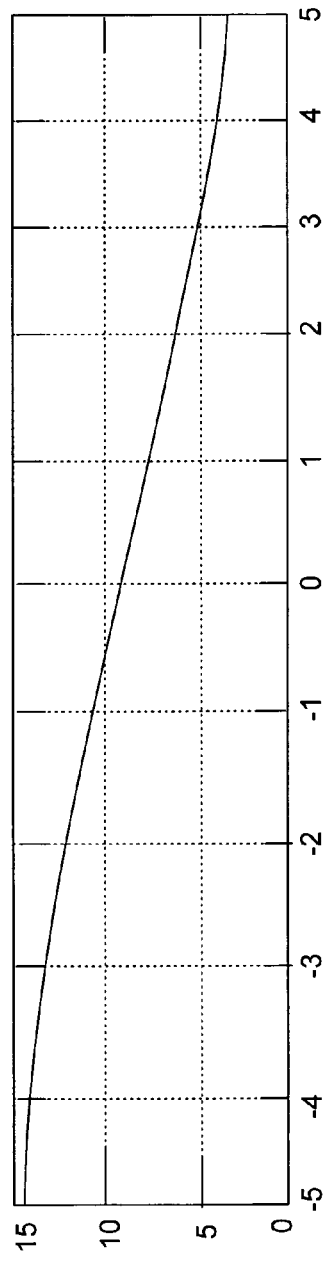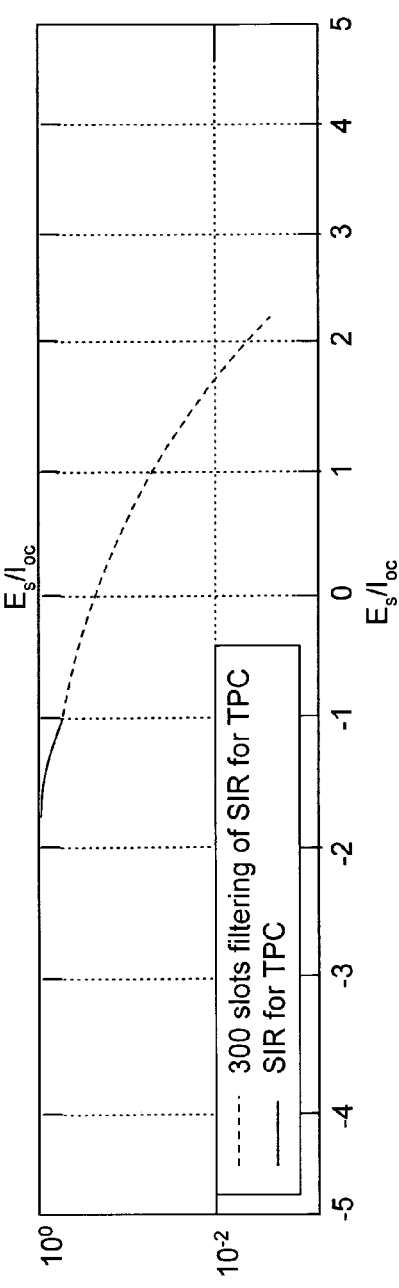
Fig. 1a
Fig. 1b
Fig. 1c

ESTIMATION OF INTERFERENCE IN A RADIO COMMUNICATION NETWORK

This application claims benefit of Provisional application Serial No. 60/331,191, filed on Nov. 09, 2001.

BACKGROUND

The present invention relates to interference in radio communication networks, and more specifically to determinations of intra- and inter-cell interference and downlink channel quality in radio communication networks.

Radio communication networks are well known. For any practical embodiment, it is important that such a network be designed to operate in accordance with at least one of a number of well-known standards. A recent set of such standards is known as the Universal Mobile Telecommunications System (UMTS). UMTS is a part of the International Telecommunications Union's "IMT-2000" vision of a global family of "third-generation" (3G) mobile communications networks. It is expected that UMTS will play a key role in creating the future mass market for high-quality wireless multimedia communications that will approach 2 billion users worldwide by the year 2010.

In radio communication networks, such as those which operate in accordance with UMTS, it is desirable to obtain a measure of the downlink channel quality. It will be recognized by those skilled in the art that the downlink channel is a channel for transmissions from base stations to mobile stations. One known method for obtaining a measure of the downlink channel quality is for a mobile station to measure the block error rate (BLER) of transmissions received from a base station. In order to obtain a satisfactory BLER estimation, more than 100 error events must occur. Accordingly, with a BLER of 1%, the BLER estimation will require 1,000 blocks to provide a satisfactory BLER estimation.

Recently, investigations have been made into achieving a relatively fast mechanism for obtaining a measure of downlink channel quality. Specifically, it would be desirable to obtain a measure of the downlink channel quality within 100–300 milliseconds. However, the time required to collect the statistics to obtain a satisfactory BLER, (1000 blocks in the example above), does not allow the use of BLER to obtain a determination of downlink channel quality within the desired range of 100–300 milliseconds.

One mechanism which has been proposed for achieving a relatively fast measurement of downlink channel quality is the use of signal-to-interference (SIR) measurements on each radio link. However, there are many deficiencies to the use of SIR measurements in networks such as those which operate according to UMTS. For example, SIR measurements are not currently included in the signaling between mobile stations and base stations. Accordingly, mobile stations which are release 99 and release 4 terminals will not be able to perform these measurements. Furthermore, this solution adds yet another measurement that the mobile stations would have to perform on the received dedicated channel.

Another deficiency of SIR measurements is that they are degraded by the bias at low SIR levels. FIGS. 1a–1c illustrate this bias. In FIGS. 1a–1c $E_s$ represents the symbol energy while $I_{oc}$ represents the interference energy to the carrier signal. FIGS. 1a, 1b and 1c are graphs showing ideal simulations of the absolute performance of SIR measurements on dedicated channels received on an AWGN channel. In FIGS. 1a and 1b the simulations are illustrated with 1 slot and 300 slots averaging, while FIG. 1c illustrates only 300 slots averaging. Under these conditions, the intra-cell interference does not interfere with the dedicated channel and is therefore not used as a parameter. The symbol energy, Es, is 10*log(SF)*Ec. For this 12.2 kbps test case, Ec=Es−24 dB. As illustrated in FIG. 1a, the performance of the measurement was degraded by the bias at low SIR levels. As illustrated in FIG. 1b, the variance of the estimated SIR increases as the SIR decreases. The variance of the measurement is, however, very small after averaging over 200 ms, i.e., 300 slots, as illustrated by the dashed curve in FIG. 1b which essentially is on the x-axis. With a linearized estimate, the variance will increase. FIG. 1c illustrates that for the case of 300 slot averaging, as the SIR decreases the block error rate will increase. Accordingly, it can be seen that using SIR measurements to achieve a fast measurement of the downlink channel quality will provide unacceptable results at low SIR levels. Therefore, there is a need for a better solution to the problem of providing SIR measurements on the downlink channel.

Although, as described above, there are known mechanisms for obtaining a measure of downlink channel quality, most known mechanisms do not provide the downlink channel quality within the 100–300 millisecond range required to achieve the above-identified benefits of a fast measure of downlink channel quality. For example, as discussed above, in order to measure the downlink channel quality using the block error rate (BLER), a mobile station must receive many blocks from a base station, 1,000 blocks with a 1% BLER, to obtain a satisfactory BLER estimation. This process will take longer than the 100–300 millisecond range required to achieve the above-identified benefits of a fast measure of downlink channel quality. Other mechanisms, such as employing SIR measurements, to estimate downlink channel quality are not backward compatible with existing mobile stations and exhibit a bias at low SIR levels. Accordingly, it would be desirable to provide methods and apparatus to achieve a measure of downlink channel quality which is relatively fast, i.e., within 100–300 milliseconds, that is backward compatible with existing mobile stations and which performs well under a variety of SIR levels.

SUMMARY OF INVENTION

The present invention overcomes the above-identified and other deficiencies of conventional techniques for estimating downlink channel quality. Specifically, the present invention employs defined network measurements, network parameters and mobile station measurements to obtain an estimation of the downlink channel quality.

In accordance with one embodiment of the present invention, a method is provided for determining channel quality in a radio communication network. The network measures a transmitted code power associated with a base station. Next the network acquires a power associated with a pilot channel. The network receives from a mobile station a measurement of a quality of the pilot channel received by the mobile station. A determination of the downlink channel quality is performed using the measured transmitted code power, the acquired power associated with the pilot channel and the received measurement of the quality of the pilot channel received by the mobile station.

BRIEF DESCRIPTION OF THE DRAWINGS

The objects and advantages of the invention will be understood by reading the following detailed description in conjunction with the drawings in which:

FIGS. 1a, 1b and 1c are graphs showing ideal simulations of the absolute performance of SIR measurements on dedicated channels received on an AWGN channel, performed with 1 slot and 300 slots averaging;

DETAILED DESCRIPTION

The present invention is directed to the measurement of downlink channel quality in a radio communication network. More specifically, the present invention is directed to achieving a relatively fast measurement of downlink channel quality in a radio communication network.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 2:
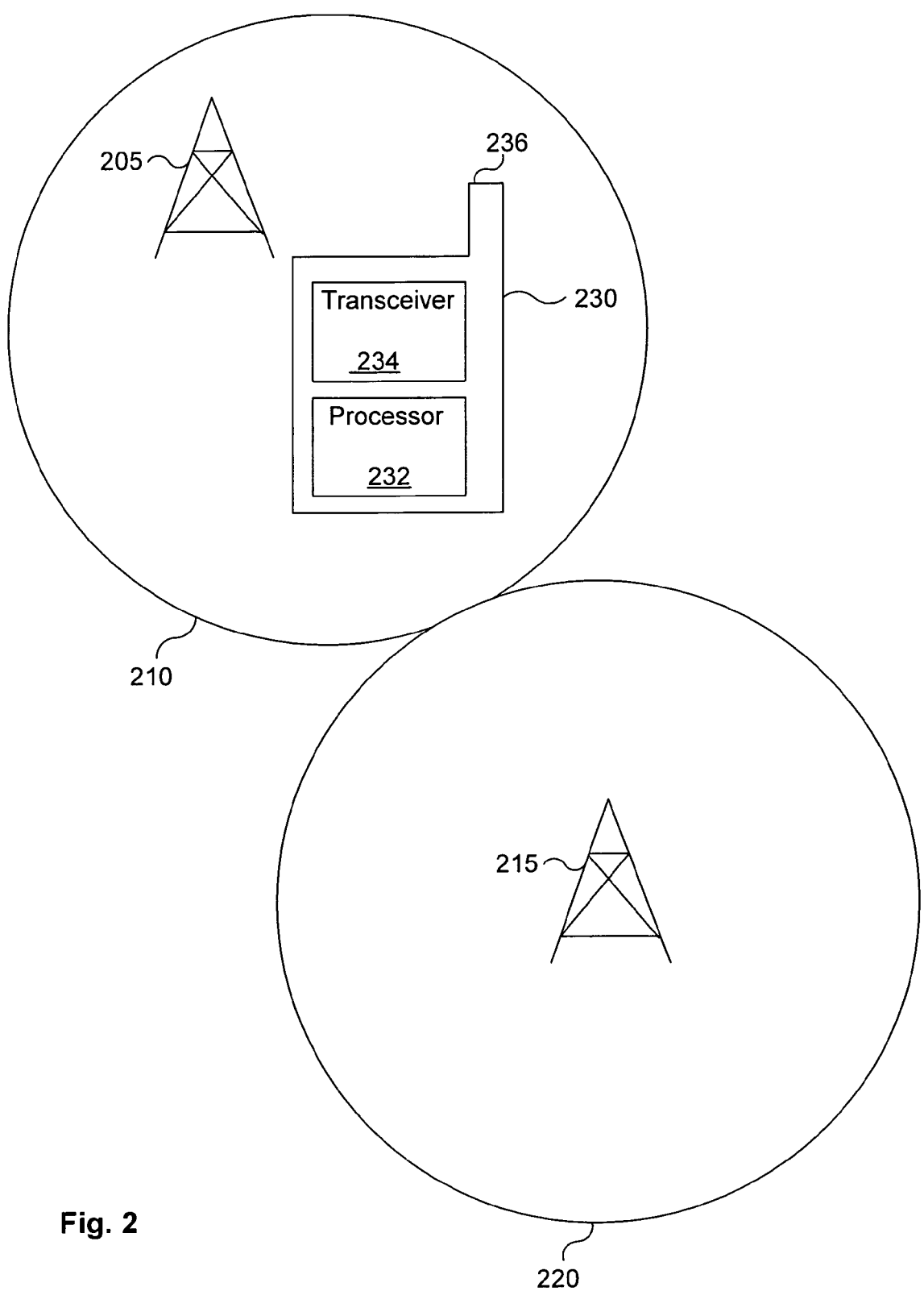
FIG. 2 illustrates a radio communication network in accordance with the present invention.

The mechanisms for providing a fast measurement of the downlink channel quality which overcomes the above-identified deficiencies of prior mechanisms will now be described in connection with FIG. 2. FIG. 2 illustrates an exemplary radio communication network in accordance with the present invention. The network 200 includes a first cell 210 and a second cell 220, each cell respectively including a base stations 205 and 215. Also illustrated in FIG. 2 is a mobile station 230. The mobile station 230 includes a processor 232, a transceiver 234 and an antenna 236. Although not illustrated in FIG. 2, it will be recognized that there may be more than one mobile station in any particular cell, and that the mobile station can include many more components than those illustrated in FIG. 2, e.g., a display, a keypad, a speaker, and a microphone. In addition, although only two cells are illustrated in FIG. 2, a radio communication network will typically include many more cells.

In accordance with the present invention, instead of having the mobile station 230 measure the SIR per radio link, already defined measurements and parameters can be employed to provide a fast estimation of the downlink channel quality. More particularly, the present invention employs the Universal Terrestrial Radio Access Network (UTRAN) measurements of the Transmitted Carrier Power and the Transmitted Code Power. The measurement named "Transmitted Carrier Power" is the ratio between the total transmitted power and the maximum transmission power, and this measurement is performed at the transmit antenna connector of the base station, e.g., base station 205. The Transmitted Code Power is defined as the transmitted power on one channelization code on one given scrambling code on one given carrier, and this measurement is performed on the Dedicated Physical Control Channel (DPCCH) field of any dedicated radio link transmitted from the base station 205 and reflects the power on the pilot bits of the DPCCH-field. This measurement is performed at the transmit antenna of the base station 205.

The present invention also employs the UTRAN parameter Primary Common Pilot Channel (CPICH) Power. This parameter is known by the base station 205. The mobile station performs a measurement of the carrier power (Ec) to the total interference (Io) of the received Common Pilot Channel (CPICH_Ec/Io). This measurement provides an estimate of the quality of the channel. It will be recognized by those skilled in the art that Io is the total received power including the carrier power Ec. However, it will also be recognized that Io is often referred to as interference even though this measurement includes the carrier power Ec.

With these measurements, the (Received Signal power/Total Interference), the (Received Signal power)/(Inter-cell interference) and the (Received Signal power)/(Intra-cell interference) can be calculated for the case of one radio link only. More particularly, one can calculate:

$$\frac{\text{Received dedicated code power}}{\text{Total interference}} =$$

$$\frac{\text{DPCH\_Ec}}{Io} = \frac{\text{Transmitted Code Power}}{\text{Primary } CPICH \text{ Power}} \times \text{Received CPICH\_E}_c/I_o\big|_{Rx}$$

where the Transmitted Code Power is the power associated with the dedicated channel for which the measurements should be performed. One can also calculate:

$$\frac{\text{Received dedicated code power}}{\text{Inter-cell interference}} =$$

$$\frac{\text{DPCH\_Ec}}{Io - Ior} = \frac{\text{Transmitted Code Power}}{\text{Primary } CPICH \text{ Power}} \times$$

$$\frac{1}{\dfrac{1}{\text{Received CPICH\_E}_c/I_o\big|_{Rx}} - \dfrac{\text{Transmitted Carrier Power}}{\text{Primary } CPICH \text{ Power}}}$$

Finally, one can calculate:

$$\frac{\text{Received dedicated code power}}{\text{Intra-cell interference}} = \frac{\text{Transmitted Code Power}}{\text{Transmitted Carrier Power}}$$

By using the above, only the CPICH_Ec/Io needs to be measured in the mobile station to calculate the ratio of dedicated power and inter-cell interference. Furthermore, the ratio of the dedicated power and the intra-cell interference is already known in the network, using, for example, (Transmitted Code Power)/(Transmitted Carrier Power).

The present invention is also applicable to a soft handover scenario. Referring again to FIG. 2, assume that mobile station 230 is performing a soft handover between base station 205 and base station 215. While the mobile station 230 is performing soft handover, the mobile station will have established radio links with both base station 205 and base station 215. Accordingly, it would be desirable to determine the downlink channel quality which the mobile station 230 is experiencing accounting for both the radio link with base station 205 and the radio link with base station 215.

In the case of a measurement of the inter-cell and intra-cell interference of soft handover, these parameters can be calculated for each radio link supporting the soft handover and the total "inter-cell interference" can be defined as the combination of the inter-cell interference from the different radio links supporting soft handover. Then the interference on one radio link coming from any other cells, including the other cells in the active set, is included in the inter-cell interference measurement. The signal level from each of the N radio links supporting soft handover can be combined. In soft handover, the inter-cell interference is larger than the intra-cell interference. Therefore, assuming all interference is not orthogonal to the signal from that radio link, the combined "Received dedicated code power/Interference" is equal to the sum of the "Received dedicated code power/ Total Interference" from each radio link. Accordingly, for N radio links involved in soft handover, the downlink channel quality is determined using the following formula:

$$\sum_{n=1}^{N} \left( \frac{Transmitted\ Code\ Power_n}{Primary\ CPICH\ Power_n} \times Received\ CPICH\_E_c/I_o \big|_{Rx\ n} \right)$$

It should be recognized that the equation above is valid when the quality is based on Ec/Io, where to is the total received power. One of ordinary skill in the art will recognize that this equation can be modified to employ inter- and intra-cell Ec/Io.

Figure 3:
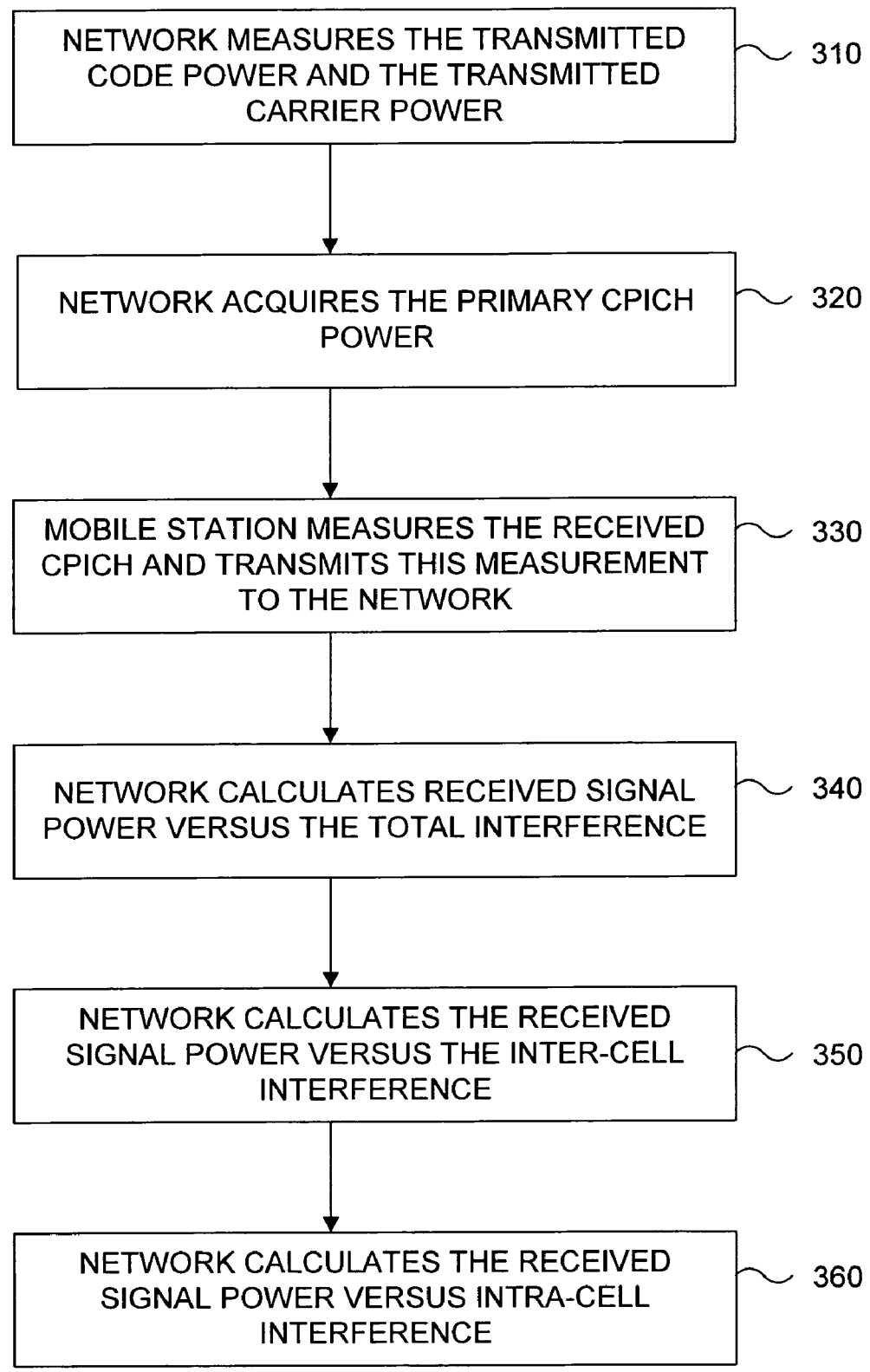
FIG. 3 illustrates an exemplary method for obtaining a measure of the downlink channel quality in accordance with the present invention.

Now that the general operation of the present invention has been described, a description of an exemplary method for implementing the present invention is described in connection with FIG. 3. Initially, the network measures the transmitted code power and the transmitted carrier power (step 310). As discussed above, these measurements are performed at the transmit antenna of the base station, and these measurements are performed by the base station. Next, the network acquires the Primary CPICH Power (step 320), the Primary CPICH Power being a parameter known to the base station. The mobile station measures the received CPICH, i.e., Received CPICH_Ec/Io, and transmits this measurement to the network (step 330). The network then calculates the received signal power versus the total interference (step 340), the received signal power versus the Inter-cell interference (step 350) and the received signal power versus Intra-cell interference (step 360). The calculations performed in steps 340–360 can be performed either in the base station, in a node above the base station in the network hierarchy (e.g., in the base station controller (BSC)), or anywhere else in the network which has the processing capacity for such calculations.

The techniques disclosed for measuring downlink interference provide very good performance for the measurements. To determine the performance of the measurements, it can be assumed that for an Average White Gaussian Noise (AWGN) channel the Transmitted Carrier Power measurement is within 5% of its actual value, the Transmitted Code Power measurement is within 3 dB of its actual value, and the Received CPICH_Ec/Io measurement is within the range of 1.5–3 dB of its actual value. Assuming the accuracy of the transmitted CPICH power is much better than 3 dB, the total accuracy of the techniques of the present invention is in the range of +/−3 dB for an AWGN channel in the worst case. In comparison, for a SIR measurement, the inaccuracy of an ideal measurement seems to be very small. However, in actual implementation the inaccuracy of the SIR measurements will increase at least to a couple of dBs.

For a fading channel, the received CPICH_Ec/Io measurement will be degraded, with the amount of degradation depending on the propagation conditions. However, the CPICH power is usually reasonably high and layer 1 filtering is applied on this measurement. Therefore, it is assumed that the degradation will not be severe. In comparison, for the SIR measurement, the problems are more severe, since the SIR is currently not defined in a multipath channel. Unless the SIR measurement is defined for a multipath channel, there is a risk that different mobile stations will not behave in the same way, and therefore the inaccuracy will increase both because different implementations will behave differently and because the actual measurement is degraded due to the fading.

From the comparison above, it can be seen that the present invention which employs existing measurements in the mobile station and the network provides a very similar measure of downlink interference on an AWGN channel to that of the mobile station actually measuring the SIR per radio link. However, with respect to fading multipath channels, the SIR must be well-defined before the accuracy can be estimated, whereas the received CPICH_Ec/Io used for measurements in the present invention is easier to generalize the definition to multipath channels.

The SIR is a measurement of the absolute quality while the techniques of the present invention provide an estimate of the geometry factor since it separates the intra- and inter-cell interference cases. The present invention by employing already existing measurements provides a number of benefits over actually performing the SIR measurement. These benefits including estimation of downlink coverage for a cell, for example, performing a check on the FACH. With this measurement, the cell coverage in the downlink can be estimated with only CPICH measurements performed by the mobile station. In order to use a SIR measurement, a dedicated channel has to be set up. In addition, the present invention allows for investigations on intra-cell interference, for example, practical figure of loss of orthogonality factor in different types of cells. The intra-cell interference is estimated directly, the loss of orthogonality can be estimated by knowing the intra- and inter-cell interference together with an estimation of received power on the dedicated channel.

The present invention also provides for investigations on inter-cell interference, for example, refinement of planning parameters (e.g., antenna tilt) provided by the prediction tool (in-the-field validation). The inter-cell interference is estimated directly from this measurement. Finally, the present invention can be employed for the distribution of perceived radio quality indication for a given service (or class of application). For example, test of Downlink quality for the various users in a cell using a 64 kbps circuit-switched Radio Access Bearer. The perceived quality of the received dedicated channel can be estimated by the total interference, the inter-cell interference and also if some estimation of the orthogonality factor is available, for example, using the BLER value.

Furthermore, the above-described estimation procedure provides very accurate estimations of the parameters. This is because the accuracy of the Node B Tx measurements are very good, the transmitted Code Power Measurement has a specified accuracy of +/−3 dB, and the other measurements are much better. Therefore, the accuracy of this measurement will be on the order of +/−3 dB. By contrast, a SIR measurement in the mobile station will have a much higher inaccuracy. Other absolute requirements for the mobile station have an inaccuracy on the order of 6 dB.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in anyway.

What is claimed is:

1. A method for determining channel quality in a radio communication network comprising the steps of:
   measuring, by the network, a transmitted code power associated with a base station;
   acquiring, by the network, a power associated with a pilot channel;
   receiving, by the network from a mobile station, a measurement of a quality of the pilot channel received by the mobile station;
   measuring, by the network, a transmitted carrier power; and,
   determining downlink channel quality using the measured transmitted code power, the acquired power associated with the pilot channel and the received measurement of the quality of the pilot channel received by the mobile station,
   wherein the step of determining downlink channel quality comprises a step of determining a channel quality based on interference within a cell associated with the base station using the following formula:

(Transmitted Code Power/Primary CPICH Power)×(1/ ((1/Received CPICH_$E_c$/$I_o I_{RX}$)−(Transmitted Carrier Power/Primary CPICH Power)))

wherein the Primary CPICH Power is the power associated with the pilot channel, the Received CPICH _$E_c$/$I_o I_{RX}$ is the measurement of the power of the pilot channel received by the mobile station.

2. The method of claim 1, wherein the downlink channel quality is a ratio between a received dedicated code power and a total amount of interference in a cell associated with the base station, and wherein the downlink code channel quality is determined using the following formula:

$$\frac{Transmitted\ Code\ Power}{Primary\ CPICH\ Power} \times Received\ \text{CPICH}\_E_c/I_o\big|_{Rx}$$

wherein the Primary CPICH Power is the power associated with the pilot channel, and received CPICH _$E_c$/$I_o I_{RX}$ is the measurement of the quality of the pilot channel received by the mobile station.

3. The method of claim 1, further comprising the step of:
   measuring, by the network, a transmitted carrier power,
   wherein the step of determining downlink channel quality comprises a step of determining a channel quality based on interference within a cell associated with the base station using the following formula:

$$\frac{Transmitted\ Code\ Power}{Transmitted\ Carrier\ Power}.$$

4. The method of claim 1, wherein if a mobile station is performing a soft handover between the base station and another base station, the mobile station having a first radio link with the base station and a second radio link with the another base station, the measuring, acquiring, receiving, and determining steps are performed for both the first and second radio links, and a total downlink channel quality is determined based upon a combination of the determined downlink channel quality for the first radio link and the determined downlink channel quality for the second radio link.

5. The method of claim 4, wherein the total downlink channel quality is determined by the following formula:

$$\sum_{n=1}^{N}\left(\frac{Transmitted\ Code\ Power_n}{Primary\ CPICH\ Power_n} \times Received\ \text{CPICH}\_E_c/I_o\big|_{Rx\ n}\right)$$

wherein N is the number of radio links supporting soft handoff for the mobile station, the Primary CPICH Power is the power associated with the pilot channel, and received CPICH _$E_c$/$I_o I_{RX}$ is the measurement of the power of the pilot channel received by the mobile station.

6. A radio communication network comprising:
   a base station which measures a transmitted code power associated with a transmission from the base station, which acquires a power associated with a pilot channel transmitted by the base station, and receives from a mobile station a measurement of a quality of the pilot channel received by the mobile station; and
   a base station controller which receives the transmitted code power, the power associated with the pilot channel and the measurement of the quality of the pilot channel from the base station and which determines downlink channel quality using the measured transmitted code power, the acquired power associated with the pilot channel and the received measurement of the quality of the pilot channel received by the mobile station;
   wherein the base station also measures a transmitted carrier power, and wherein the determination of downlink channel quality comprises a determination of a channel quality based on interference within a cell associated with the base station using the following formula:

(Transmitted Code Power/Primary CPICH Power)×(1/ ((1/Received CPICH_$E_c$/$I_o I_{RX}$)−(Transmitted Carrier Power/Primary CPICH Power)))

wherein the Primary CPICH Power is the lower associated with the pilot channel, the Received CPICH _$E_c$/$I_o I_{RX}$ is the measurement of the power of the pilot channel received by the mobile station.

7. The radio communication network of claim 6, wherein the downlink channel quality is a ratio between a received dedicated code power and a total amount of interference in a cell associated with the base station, and wherein the downlink code channel quality is determined using the following formula:

$$\frac{Transmitted\ Code\ Power}{Primary\ CPICH\ Power} \times Received\ \text{CPICH}\_E_c/I_o\big|_{Rx}$$

wherein the Primary CPICH Power is the power associated with the pilot channel, and received CPICH_$E_c$/$I_o I_{RX}$ is the measurement of the quality of the pilot channel received by the mobile station.

8. The radio communication network of claim 6, wherein the base station also measures a transmitted carrier power, and wherein the determination of downlink channel quality comprises a determination of a channel quality based on interference within a cell associated with the base station using the following formula:

$$\frac{\text{Transmitted Code Power}}{\text{Transmitted Carrier Power}}.$$

9. The radio communication network of claim 6, wherein if a mobile station is performing a soft handover between the base station and another base station, the mobile station having a first radio link with the base station and a second radio link with the another base station, the measuring, acquiring, receiving, and determining are performed for both the first and second radio links, and a total downlink channel quality is determined based upon a combination of the determined downlink channel quality for the first radio link and the determined downlink channel quality for the second radio link.

10. The radio communication network of claim 9, wherein the total downlink channel quality is determined by the following formula:

$$\sum_{n=1}^{N}\left(\frac{\text{Transmitted Code Power}_n}{\text{Primary CPICH Power}_n} \times \text{Received CPICH\_E}_c/I_o\big|_{Rx\ n}\right)$$

wherein N is the number of radio links supporting soft handoff for the mobile station, the Primary CPICH Power is the power associated with the pilot channel, and received $\text{CPICH\_E}_c/I_o I_{RX}$ is the measurement of the power of the pilot channel received by the mobile station.

* * * * *